United States Patent
Barnes

(10) Patent No.: US 10,465,834 B2
(45) Date of Patent: Nov. 5, 2019

(54) PIPE LINING LEAK TESTING METHODS AND APPARATUS

(71) Applicant: Pioneer Lining Technology Limited, Clydebank (GB)

(72) Inventor: Stephen Barnes, Clydebank (GB)

(73) Assignee: Pioneer Lining Technology Limited, Clydebank (GB)

( * ) Notice: Subject to any disclaimer, the term of this patent is extended or adjusted under 35 U.S.C. 154(b) by 73 days.

(21) Appl. No.: 15/752,194

(22) PCT Filed: Aug. 18, 2016

(86) PCT No.: PCT/GB2016/052558
§ 371 (c)(1),
(2) Date: Feb. 12, 2018

(87) PCT Pub. No.: WO2017/029507
PCT Pub. Date: Feb. 23, 2017

(65) Prior Publication Data
US 2018/0231168 A1    Aug. 16, 2018

(30) Foreign Application Priority Data
Aug. 19, 2015   (GB) .................................. 1514764.8

(51) Int. Cl.
*F16L 55/165*   (2006.01)
*G01M 3/28*   (2006.01)
(Continued)

(52) U.S. Cl.
CPC ......... *F16L 55/1652* (2013.01); *F16L 55/165* (2013.01); *G01M 3/28* (2013.01);
(Continued)

(58) Field of Classification Search
CPC . F16L 55/1652; F16L 55/165; F16L 2201/30; G01M 3/2815; G01M 3/28; B29C 63/46; B29C 63/34
(Continued)

(56) References Cited

U.S. PATENT DOCUMENTS 3,129,726 A * 4/1964 Moore ...................... F16K 7/10
138/89
3,462,825 A * 8/1969 Pope ..................... B29C 63/343
138/140

(Continued)

FOREIGN PATENT DOCUMENTS

EP    0 233 006    8/1987
EP    0 266 951    5/1988
(Continued)

*Primary Examiner* — Nathaniel T Woodward
(74) *Attorney, Agent, or Firm* — Levy & Grandinetti

(57) ABSTRACT

Methods and apparatus enable the integrity of a liner pipe to be quickly and effectively tested in the field, while permitting rapid removal and replacement of the liner pipe if it is compromised. The liner pipe is leak tested prior to reversion, after being pulled through a host pipe to be lined via a swaging die and while the liner pipe is still under tension. If the liner pipe exhibits a leak, it can be removed from the liner pipe immediately and, importantly, before it has expanded to contact the host pipe. Leak testing apparatus includes a packer, which seals the opposite end of the liner pipe from the end which is pulled, creating a contained fluid volume upon which the leak test is performed. The leak test may be a pressure test or a vacuum test or any other suitable test.

35 Claims, 5 Drawing Sheets

(51) Int. Cl.
*B29C 63/34* (2006.01)
*B29C 63/46* (2006.01)

(52) U.S. Cl.
CPC ............ *G01M 3/2815* (2013.01); *B29C 63/34* (2013.01); *B29C 63/46* (2013.01); *F16L 2201/30* (2013.01)

(58) Field of Classification Search
USPC ...................................................... 73/40.5 R
See application file for complete search history.

(56) References Cited

U.S. PATENT DOCUMENTS

| | | | | |
|---|---|---|---|---|
| 4,273,605 | A * | 6/1981 | Ross | ........................ B08B 9/047 138/140 |
| 9,851,042 | B2 * | 12/2017 | Daveloose | .......... F16L 55/1656 |
| 2009/0205733 | A1 | 8/2009 | Stringfellow et al. | |
| 2010/0096021 | A1 * | 4/2010 | Keyes | ................... F16L 59/143 137/15.01 |

FOREIGN PATENT DOCUMENTS

| | | |
|---|---|---|
| EP | 2 902 766 | 8/2015 |
| GB | 2 186 340 | 8/1987 |
| JP | 2-63722 | 3/1990 |
| WO | WO 2005/090848 | 9/2005 |

\* cited by examiner

PIPE LINING LEAK TESTING METHODS AND APPARATUS

The present invention relates to the field of lining pipelines. More specifically, the present invention concerns improvements in methods of testing the integrity of a pipe lining in the field, and corresponding apparatus and methods of lining lengths of pipe.

BACKGROUND TO THE INVENTION

It is known that the life and performance of new and existing pipelines can be extended and optimised by lining lengths of metal pipe with polymer liners. For example, the Applicant's Swagelining® pipe lining service allows existing pipelines to be remediated and new pipelines to be provided with corrosion resistance by installing a polymer liner that remains in tight contact with the inside of a host pipe.

In a typical pipe lining process of this kind, a polymer liner pipe is drawn into a host pipe via a die which reduces it in diameter. The liner pipe is drawn by a pulling device such as a winch connected to the end of the pipe by a cable and pulling cone arrangement. When pulling tension is removed, the liner pipe undergoes a process known as "reversion" in which the memory characteristics of the material of the liner pipe cause it to undergo radial expansion as it reverts towards its original dimensions and until it contacts the inner surface of the host pipe. As a result of selecting a liner pipe of an outer diameter equal to or, preferably, greater than the inner diameter of the host pipe, the host pipe is provided with an extremely close fitting lining.

When lining a long section of host pipe, it may be the case that the liner pipe is constructed from a number of sections that are successively butt-welded, as the liner pipe is drawn through the host pipe, to produce a liner pipe of sufficient length. Regardless of whether the liner pipe is so constructed on-site, taken from a spooled or continuous length of liner pipe on indeed extruded on demand, there is a risk that the liner pipe may contain one or more leaks. It is well understood that at the butt-weld locations there may be leaks, or weaknesses that could result in leaks, but it is also understood that there may be perforations or damage to the liner pipe itself (or liner pipe sections) which presents the risk of leak.

Understandably, if the liner pipe is perforated or ruptured or exhibits any kind of leak (whether at the location of a butt-weld or elsewhere) then the integrity of the corrosion barrier provided by the liner pipe is compromised. At present, internal corrosion barriers for pipelines—be they liners, sprayed polymer, painted epoxies or other forms of surface coating for example—are difficult to test with anything approaching complete reliability. Even a small hole in a protective coating can result in so-called "pin hole corrosion" that can very rapidly produce a hole through the wall of a steel host pipe.

One known method of testing the integrity of polymer lined pipe is to allow the reversion process to complete, and attach special end connectors to each end of the pipe which is then flooded with water for the purposes of leak detection. The pressurised water will escape through any perforations or ruptures and into the annular space between the liner and the host steel pipe. The end connectors provide vent points for the annular space and if water is detected at the vents then the liner has been compromised. This is a costly exercise, and requires the production and controlled disposal of the water used in the test. Furthermore, the process is slow because it may take several days for a liner to revert fully, and it may then take several days to perform the test.

An alternative method of testing the integrity of a (non-conductive) protective coating is to perform a so-called Holiday or Continuity test in which a low voltage is applied across a test area; if electrical current is detected in the test area this is indicative of the presence of discontinuities in the coating (for example, pinholes or ruptures). However, these methods are generally performed on external coatings and it would be extremely difficult to perform them on internal coatings where direct access is limited.

U.S. Pat. No. 4,273,605 relates to a method of lining and sealing hollow ducts in which a flattened flexible tube is inflated to contact a pipeline interior wall. This pressure may subsequently be used to test the integrity of the lined pipeline.

Similarly, GB2186340 A discloses a pipe lining and a closure that can be used for pressure testing of a liner pipe. The internal wall of the liner pipe is pressurised to expand it into engagement with the internal wall of the host pipe—in this case for enforced reversion rather than inflation. Thereafter, pressurisation may be used to test the integrity of the lined pipeline.

US 2009/0205733A1 discloses a "core pipe" which is deformable into a C-shape to facilitate insertion into a host pipe. The deformed pipe is wrapped in Mylar to hold it in that shape. Subsequent to insertion in the host pipe, the core pipe is sealed and pressurised to overcome the resistance provided by the Mylar wrap and reform the pipe into its original circular cross-section. Post re-forming, and while the core pipe is still sealed, a full hydrostatic test at operational pressure may be performed to verify pipe integrity.

It is an object of at least one aspect of the present invention to provide a method of testing the integrity of a pipe lining. Embodiments of aspects of the present invention are intended to realise this object and to obviate or mitigate one or more disadvantages of existing integrity tests.

Further aims and objects of the invention will become apparent from reading the following description.

SUMMARY OF THE INVENTION

According to a first aspect of the invention, there is provided a method of testing the integrity of a pipe lining, the method comprising pulling the pipe lining at least partially through a host pipe to be lined via apparatus which temporarily reduces the external diameter of the pipe lining, and performing a leak test on the pipe lining prior to releasing pulling tension on the pipe lining.

Maintaining pulling tension on the pipe lining prevents the pipe lining from undergoing reversion and as such the pipe lining can be easily removed if the leak test indicates a leak in the pipe lining. Furthermore, holding the pipe lining in tension may stimulate any discontinuity or defects in the liner to stretch open and thereby exaggerate some kinds of leaks and improve the likelihood of detection.

Preferably, the apparatus may comprise one or more dies. Alternatively, or additionally, the apparatus may comprise one or more rollers.

Accordingly, the method may further comprise removing the pipe lining from the host pipe responsive to the leak test. The method may further comprise replacing the pipe lining, or repairing the pipe lining, prior to pulling the pipe lining through the host pipe again.

Alternatively, the method further comprises releasing pulling tension on the pipe lining responsive to the leak test.

For example, in the event a leak is detected the pipe lining is removed and in the event no leak is detected the pipe lining is allowed to undergo reversion.

Preferably, performing the leak test comprises creating an enclosed volume within the pipe lining, at least partially evacuating the enclosed volume, and monitoring the pressure within the enclosed volume.

Alternatively, performing the leak test comprises creating an enclosed volume within the pipe lining, pressurising the enclosed volume, and monitoring the pressure within the enclosed volume.

Preferably, creating an enclosed volume within the pipe lining comprises inserting one or more packers. Optionally, a first packer is inserted proximal a first end of the pipe lining and a second packer inserted proximal an opposite end of the pipe lining.

Preferably, at least partially evacuating the enclosed volume comprises removing air from the enclosed volume. Air may be removed from the enclosed volume using a vacuum pump. Air may be removed from the enclosed volume via a conduit extending through at least one of the one or more packers.

Preferably, pressurising the enclosed volume may comprise injecting air via a conduit extending through at least one of the one or more packers. Optionally, the enclosed volume is pressurised to 300 mbar. The enclosed volume may be re-pressurised after a pre-determined time period has elapsed.

Optionally, monitoring the pressure within the enclosed volume comprises calculating a pressure differential after a pre-determined time period has elapsed. The leak test may determine there to be a leak in the pipe lining if there is a loss of pressure, increase in pressure, or if the loss or increase of pressure exceeds a pre-determined limit.

Alternatively, performing the leak test may comprise creating an enclosed volume within the pipe lining, pressurising the enclosed volume and/or at least partially evacuating the enclosed volume, and monitoring for ultrasound signals within the enclosed volume, in an annular space between the pipe lining and the host pipe, and/or outside of the host pipe.

A gas escaping through a leak or perforation in a pipe lining will produce a sound signal which includes ultrasonic frequencies. By monitoring for such frequencies, the presence of a leak can be detected. Furthermore, as ultrasound is quickly attenuated in air it can be used to localise the leak.

Accordingly, performing the leak test may comprise determining a position of one or more leaks by translating an ultrasound detector relative to the pipe lining and measuring ultrasound signals as a function of position. The ultrasound detector can be located within the enclosed volume or within the annular space between the pipe lining and the host pipe.

Alternatively, the ultrasound detector can be located externally to the host pipe.

Embodiments of the first aspect of the invention may comprise features corresponding to any of the essential, preferred or optional features of any other aspect of the invention or vice versa.

The applicant recognises that the advantages of the first aspect of the invention may be realised in pipe lining techniques in which the diameter of the pipe lining is reduced by other mechanisms than by drawing through apparatus such as a die or rollers.

Accordingly, a second aspect of the invention provides a method of testing the integrity of a pipe lining, the method comprising temporarily reducing the external diameter of the pipe lining, locating the pipe lining at least partially inside a host pipe to be lined, and performing a leak test on the pipe lining before the external diameter of the pipe lining reverts.

The external diameter of the pipe lining may be reduced by any means. For example, the pipe lining may be folded and the folded liner may be retained with a retaining means such as a clip or wrap.

The pipe lining may be inserted into the host pipe via apparatus which reduces the external diameter of the pipe lining. The apparatus may comprise one or more dies. Alternatively, or additionally, the apparatus may comprise one or more rollers.

The reduced diameter pipe lining may also be located inside the host pipe by any means. For example, the pipe lining may be pushed into the host pipe. Alternatively, or additionally, the pipe lining may be pulled into the host pipe. Further alternatively, the host pipe may be pushed or pulled over the pipe lining.

Preferably, the method further comprises allowing the pipe lining to revert or removing the pipe lining from the host pipe dependent on the leak test.

Embodiments of the second aspect of the invention may comprise features corresponding to any of the essential, preferred or optional features of any other aspect of the invention or vice versa.

According to a third aspect of the invention, there is provided a pre-reversion leak testing apparatus for testing the integrity of a pipe lining, the pre-reversion leak testing apparatus comprising a packer configured to provide an annular seal within the pipe lining prior to undergoing reversion and define a test volume, a conduit extending through the packer for pressurising or at least partially evacuating the test volume, and a leak detector for detecting one or more leaks from or into the test volume when pressurised or at least partially evacuated.

Preferably, the leak detector comprises a pressure sensor which, in use, is in fluid communication with the test volume. Alternatively, the leak detector comprises an ultrasound detector arranged to monitor for ultrasound signals along the length of the pipe lining.

The packer creates a test volume within a pipe lining and the conduit allows the test volume to be pressurised or at least partially evacuated for leak testing. In one embodiment a pressure sensor may monitor the pressure within the test volume to determine the presence of a leak. The pressure may be monitored via the conduit. In another embodiment, an ultrasound detector may detect one or more ultrasound signals corresponding to one or more leaks.

Preferably, the conduit comprises one or more valves arranged, adapted and/or configured to control the flow of leak test fluid to and/or from the test volume.

Preferably, the packer is inflatable. Alternatively, the packer comprises one or more flanges.

Optionally, the leak testing apparatus comprises a pump. Preferably, the pump is a vacuum pump arranged to remove air and/or other fluid from the test volume.

Alternatively, the leak testing apparatus comprises a fluid source. Preferably, the fluid source is an air compressor. Alternatively, the fluid source is a compressed air source.

Optionally, the leak testing apparatus comprises a second packer configured for insertion in the pipe lining at an end opposite the first packer to provide a second seal within the pipe lining, creating a test volume between the first packer and the second packer.

Optionally, the leak testing apparatus comprises a pressure relief valve configured or selected to open at a predetermined pressure to prevent the pipe lining from collapsing or undergoing forced reversion.

Embodiments of the third aspect of the invention may comprise features corresponding to any of the essential, preferred or optional features of any other aspect of the invention or vice versa.

According to a fourth aspect of the invention there is provided a method of lining a pipeline, the method comprising pulling a pipe lining at least partially through the pipeline via apparatus which temporarily reduces the external diameter of the pipe lining, performing a leak test on the pipe lining prior to releasing pulling tension on the pipe lining, and subsequently releasing pulling tension on the pipe lining to allow the pipe lining to expand into contact with the pipeline.

The apparatus may comprise one or more dies, and/or it may comprise one or more rollers.

Preferably, the method comprises retrieving the pipe lining prior to releasing pulling tension in the event of detecting a leak in the pipe lining, repairing or replacing the pipe lining, and pulling the repaired or replacement pipe lining at least partially through the pipeline via apparatus which temporarily reduces the external diameter of the pipe lining.

Preferably, a leak test is performed on the repaired or replacement pipe lining prior to releasing pulling tension on the repaired or replacement pipe lining.

The leak test may comprise a vacuum test or a pressure test.

Embodiments of the fourth aspect of the invention may comprise features corresponding to any of the essential, preferred or optional features of any other aspect of the invention or vice versa.

According to a fifth aspect of the invention there is provided a pipe lining system comprising apparatus configured to temporarily reduce the external diameter of a pipe lining, a winch configured to pull the pipe lining through a host pipe via the apparatus, and a leak testing apparatus according to the third aspect configured to test the integrity of the pipe lining after it has been pulled through the host pipe but prior to release of pulling tension from the winch.

As above, the apparatus may comprise one or more dies, and/or it may comprise one or more rollers.

Embodiments of the fifth aspect of the invention may comprise features corresponding to any of the essential, preferred or optional features of any other aspect of the invention or vice versa.

According to other aspects of the invention, there is provided a method of testing the integrity of a pipe lining, a leak testing apparatus, a method of lining a pipeline or a system for lining a pipeline, substantially as herein described with reference to the appended drawings.

BRIEF DESCRIPTION OF THE DRAWINGS

Aspects and advantages of the present invention will become apparent upon reading the following detailed description and upon reference to the following drawings (like reference numerals referring to like features which may not be explicitly described) in which.

DETAILED DESCRIPTION OF PREFERRED EMBODIMENTS

As discussed in the background to the invention above, the Applicant considers that it is not presently possible to efficiently and effectively test the integrity of a pipe lining in the field. An embodiment of the present invention is now described which overcomes this problem with the prior art.

Figure 1:
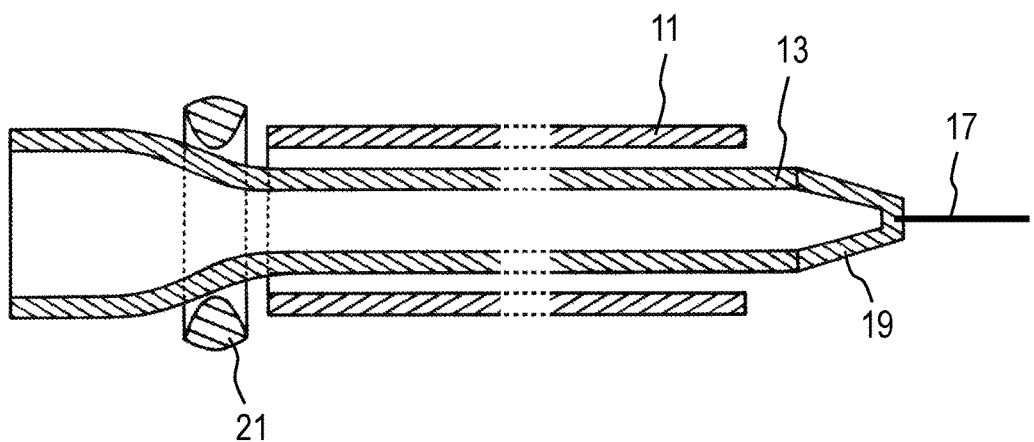
FIG. 1 is a schematic sectional view illustrating an intermediate stage in a pipe lining process in which a host pipe is being lined with a liner pipe, the liner pipe having been drawn through a swaging die to reduce its outer diameter.

FIG. 1 illustrates a buried host pipe 11 being lined with pipe lining comprising a polymer liner pipe 13. The liner pipe 13 is pulled through a swaging die 21 to reduce the outer diameter of the liner pipe 13 before being pulled through the pipe 11. The liner pipe 13 is pulled by a winch (not shown) and cable 17; the cable 17 attached to a pulling cone 19 welded to the end of the liner pipe 13. Subsequent release of the liner pipe 13, for example by removing the pulling tension provided by the winch, will allow the liner pipe 13 to expand into tight engagement with the host pipe 11 by virtue of the reversion process discussed in the background to the invention above.

Figure 2:
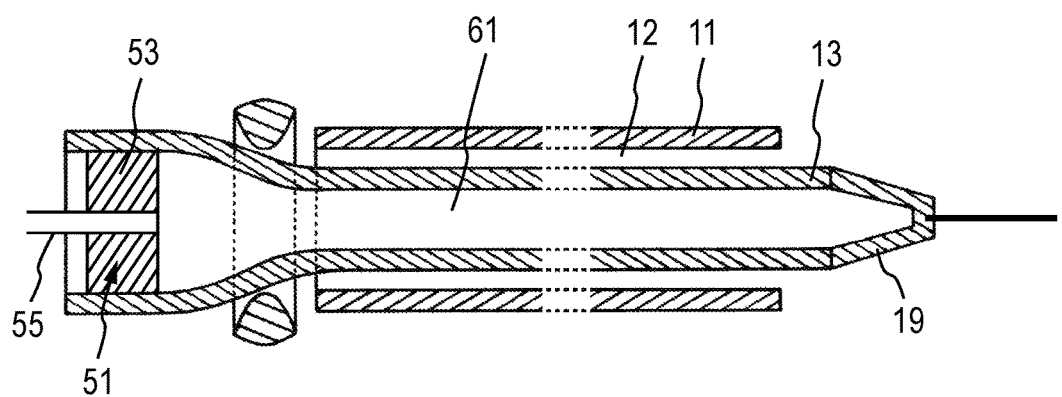
FIG. 2 is a schematic sectional view illustrating an intermediate stage in a pipe lining process in which a leak testing apparatus is inserted into the liner pipe to test the integrity of the liner pipe prior to reversion, in accordance with an embodiment of an aspect of the invention.

However, as shown in FIG. 2, prior to release of the liner pipe 13, leak testing apparatus 51 is inserted into the open end of the liner pipe 13. The leak testing apparatus 51 (exemplary embodiments of which are described in further detail below) comprises an inflatable packer 53 which, when inflated (as shown), forms an annular seal within the liner pipe 13. A test fluid supply line 55 extends through the inflatable packer 53 to provide fluid communication with the volume 61 in the liner pipe 13 enclosed by the inflatable packer 53 and the pulling cone 19.

Air is then pumped into the volume 61 through the test fluid supply line 55 to pressurise the interior of the liner pipe 13. If there is a perforation in the wall of the liner pipe 13, pressurised air will escape through the perforation resulting in a loss of pressure which can be detected using one or more pressure monitors arranged to monitor the pressure within the liner pipe 13. Note that as mentioned above, pressurisation and pressure monitoring is carried out while the liner pipe 13 is still under tension.

The volume 61 is pressurised to somewhere in the region of 300 mbar and allowed to stabilise for approximately 5 minutes, at which time it may be necessary to re-pressurise the volume 61 and re-stabilise—it is likely that there will be an initial pressure drop after the first pressurisation stage. Once the pressure is stabilised, additional re-pressurisations and re-stabilisations having been carried out as required, the pressure within the volume 61 is monitored for 15 minutes.

In the absence of a loss of pressure, it can be concluded that the liner pipe 13 is intact, at which time pulling tension can be released and the liner pipe 13 allowed to undergo reversion, in the knowledge that the liner pipe 13 will provide the host pipe 11 with the required corrosion barrier, the integrity of the liner pipe 13 having been tested and confirmed in situ.

In an alternative embodiment, the leak testing apparatus comprises a vacuum pump or the like which is used to draw air out of the test region and therefore at least partially evacuate the test region. The leak test may therefore be performed as a vacuum test. In the absence of an increase in pressure, it can be concluded that the liner pipe is intact, at which time pulling tension can be released. Of course, if the pressure within the test volume does increase or if it is not possible to reach an expected vacuum pressure, this may be indicative of a leak in the liner pipe.

In another alternative embodiment, rather than monitoring the pressure within the enclosed volume 61, leaks can be detected by monitoring for ultrasound signals along the length of the pipe lining 13. Ultrasound signals will be produced by any leaks through which gas is escaping out of or into the liner pipe and detecting such ultrasound signals will indicate the presence of a leak. A particular benefit of this approach is that because ultrasound is quickly attenuated in air, a leak (or leaks) can be located by moving the ultrasound detector along the length of the liner pipe and recording the position (or positions) that correspond to local maxima in the monitored signal. Another benefit is that the detector can be located outside the liner pipe 13—which is only possible because the test is carried out pre-reversion—which means that it is not necessary to deploy the detector within the liner pipe 13 itself, although this possibility is envisaged. It is also proposed that the ultrasound detector could be located outside of the host pipe 11, thus avoiding the need to deploy a detector within the liner pipe 13 or the host pipe 11.

It will of course be realised by the skilled person that any method of leak testing will be applicable; provided the leak test is performed while the liner pipe 13 is still under tension, i.e. before it undergoes reversion. For example, the test volume 61 (or annulus) can be pressurised with a gas such as helium and one or more sniffer probes deployed in the annulus 12 (or within the liner pipe 13) to detect if and where the gas is passing through the liner pipe 13.

There are a number of significant advantages of testing the integrity of the liner pipe 13 in this way, in comparison to prior art methods such as those described or alluded to in U.S. Pat. No. 4,273,605, GB2186340 A and US 2009/0205733A1 in which testing is only performed once the liner pipe is installed.

As the test of the present invention is performed while the liner pipe 13 is still under tension, the liner pipe 13 can be removed before it has been allowed to revert—it is extremely difficult to remove a liner pipe after reversion has taken place, and risks damage to the host pipe which it is being inserted to protect as well as the liner pipe itself. Furthermore, in tests the Applicant has discovered that holding the liner pipe in tension prevents creep of the polymer material of the liner pipe which results in more accurate measurements.

If a leak is detected, remedial action can be taken immediately and the liner pipe 13 (or a replacement) can be quickly reinstalled and retested. Furthermore, as the test is carried out when the liner pipe 13 is effectively in an elongated or longitudinally stretched form, it is to be expected that any pinholes, ruptures or the like will be correspondingly enlarged and therefore increase the likelihood of detection compared with post-reversion techniques.

In any case, a liner pipe can take up to 20-24 hours to revert fully and the Applicant's invention, by which testing pre-reversion allows liner pipe integrity to be checked in real-time, can therefore save several hours, perhaps days of operational time when compared with existing testing methods which are performed post-reversion—particularly when a leak is found and the liner pipe must be removed and replaced (and of course retested).

Note that temperature fluctuations, for example, will result in slight variations in the air pressure within the volume 61, so detection of slight pressure drops or increases (dependent on whether a pressure or vacuum test is employed) might not correspond to a leak and may therefore be acceptable. Accordingly, the determination of whether the liner pipe 13 is intact may permit pressure fluctuations in the region of, say, ±10%; in other words only a liner pipe exhibiting a pressure drop or increase of >10% will be assessed as ruptured or leaking. These figures are examples and the actual permissible range (as well as the degree of pressurisation or vacuum employed) can be determined by calculation or by experimentation, and will vary dependent on the material of the liner pipe, the temperature of the system, and/or the test fluid used.

In an alternative embodiment, temperature sensors may be provided which monitor the temperature and provide additional information which may allow pressure variations resulting from temperature variations to be compensated for or at least taken into account when determining whether there is believed to be a leak in the liner pipe.

While air is used in the example above it will be understood that any suitable fluid, be it a gas such as nitrogen or a liquid such as water supplied at low pressure, can be used for the leak testing process. Air however provides the advantage that it is easy to handle, to supply at suitable pressures and disposal can be achieved by simply venting to atmosphere.

As shown in FIGS. 1 and 2, the pulling cone 19 may be welded to the end of the liner pipe 13 to allow it to be pulled through the host pipe 11. The weld itself may exhibit some leakage and as such the permissible pressure fluctuations may take this into account.

Figure 3:
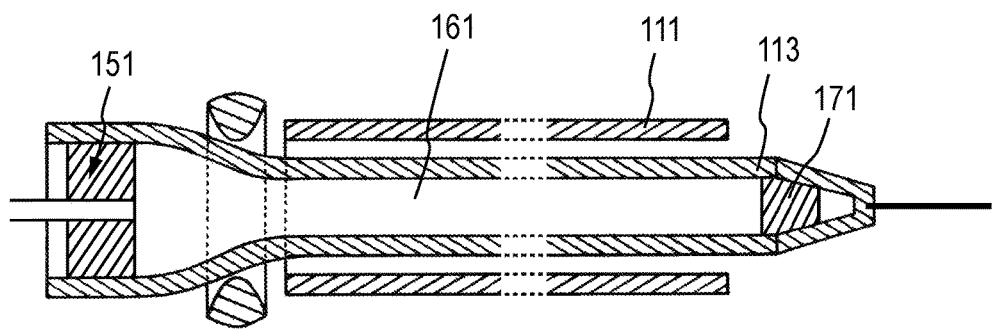
FIG. 3 is a schematic sectional view illustrating an intermediate stage in a pipe lining process in which a leak testing apparatus is inserted into the liner pipe to test the integrity of the liner pipe prior to reversion, in accordance with an alternative embodiment.

However, as shown in FIG. 3, an alternative embodiment of the invention involves disposing another inflatable packer 171 proximal the end of the liner pipe 113. The inflatable packer 171 as illustrated is disposed across the weld between the pulling cone 119 and the end of the liner pipe 113 (although it will be understood that the inflatable packer 171 could be disposed entirely within the liner pipe 113; key is that the test volume 161 is isolated from the weld).

The inflatable packer 171 can be inserted at the beginning of the operation, for example when the cone 119 is welded onto the end of the liner pipe 113 and inflated at the time but preferably subsequently such as immediately prior to testing. Of course, the inflatable packer 171 can instead be inserted and inflated immediately prior to testing. Either way, the important point is that by isolating the test volume 161 from the weld, any leak associated with that weld (which will be removed anyway when the pulling cone is cut from the liner pipe 113 to allow it to undergo reversion) will not contribute to any measured pressure loss from the test volume 161. Accordingly, the leak test corresponds to the useable length of the liner pipe 113.

In the embodiments described above, the external diameter of the liner pipe is reduced by drawing it through a swaging die. However, any method of reducing the external diameter of the liner pipe may be employed. For example, the liner pipe may be drawn through rollers, or may be folded. Notwithstanding the method of reducing the external diameter of the liner pipe, performing a leak test prior to allowing or causing the liner pipe to expand or revert towards its original dimensions allows the liner pipe to be removed with relative ease in the event of a leak or fault being detected.

Figure 4:
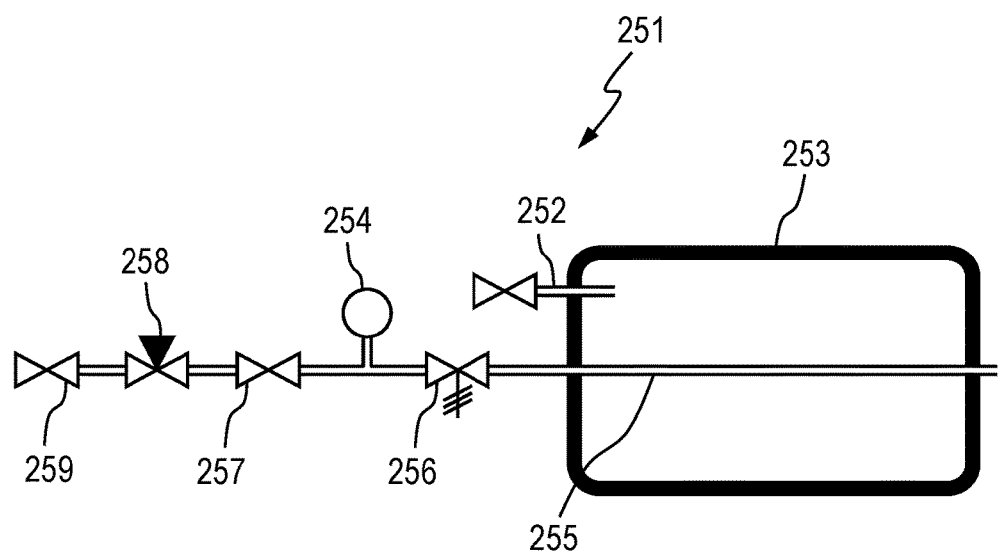
FIG. 4 is a schematic sectional view illustrating a leak testing apparatus according to an embodiment of another aspect of the present invention.

A preferred embodiment of the leak testing apparatus (indicated by reference numerals 51 and 151 in FIGS. 2 and 3, respectively) is now described with reference to FIG. 4. The leak testing apparatus 251 can be seen to comprise an inflatable packer 253 which is inflated via valved inlet 252. A test fluid supply line 255 extends through the inflatable packer 253 for fluid communication with a test volume created by the insertion of the apparatus 251 in a liner pipe. A pressure gauge 254 is in fluid communication with the test fluid supply line 255 and, once the test volume is pressurised and shut off valve 257 closed, can be used to monitor the fluid pressure within the test volume.

A pressure relief valve 256 provides a safety feature in case of an overpressure in the test volume. The pressure relief valve 256 can be selected or configured to, for example, open before the test volume is pressurised to an extent that would cause the liner pipe to undergo forced reversion. It can also open in the event of a blockage in the test fluid supply line 255 to prevent damage to the pressure gauge 254. Another shut off valve 259 is provided which, when closed, isolates the leak test apparatus 251 from a fluid supply. Once the leak test has been performed, pressure dump valve 258 provides an outlet for the venting of the leak testing fluid (which is preferably air) from the test volume.

As noted above, the integrity of the liner pipe may alternatively be tested using a vacuum test in which the test volume is partially evacuated. In this case, the leak testing apparatus may comprise a vacuum pump connected to the shut off valve 259. When the test volume is evacuated to the desired vacuum pressure the shut off valve 257 can be closed and the pressure gauge 254 used to monitor the vacuum pressure within the test volume. The pressure relief valve 256 can in this case be selected or configured to open before the test volume is evacuated to an extent that would cause the liner pipe to collapse.

Figure 5:
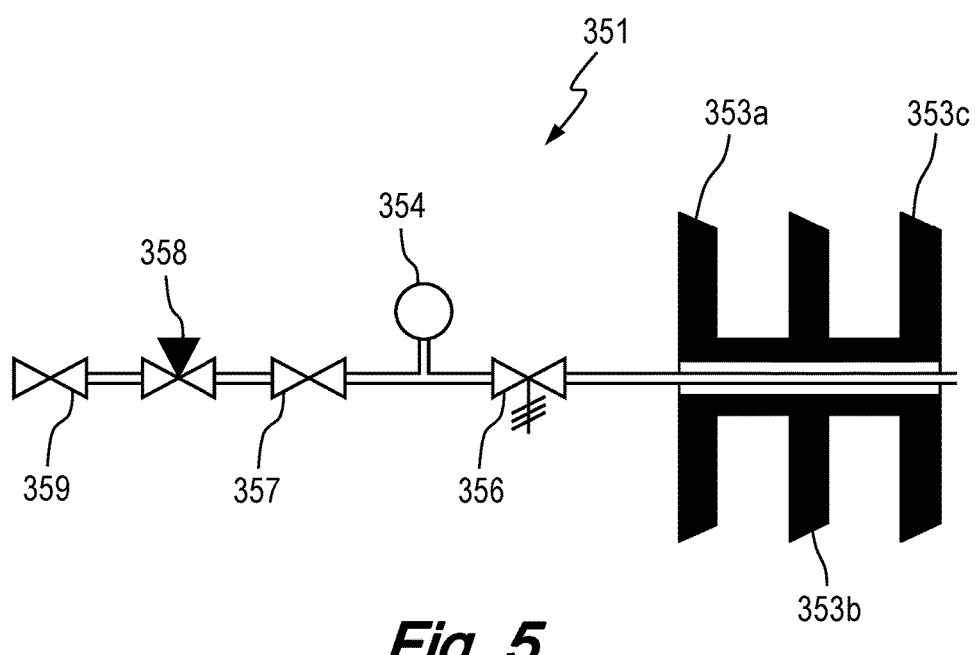
FIG. 5 is a schematic sectional view illustrating a leak testing apparatus according to an alternative embodiment.

Note that while the packer has been described as being inflatable in the foregoing embodiments, it will be understood that any corresponding packer, pig or sealing arrangement that provides an enclosed volume for leak testing the liner pipe will meet the objectives of the invention and therefore fall within the scope of the invention. FIG. 5 illustrates such an alternative embodiment of a leak testing apparatus which does not employ an inflatable packer and will now be described in further detail.

Leak testing apparatus 351 is provided with a series of flexible flanges 353a, 353b, 353c of generally circular cross-section which provide a leakproof seal with the inner surface of a liner pipe into which they are inserted. The flanges 353a, 353b, 353c may be comprised of a rubber or elastomer compound which provides sufficient flexibility to deform when pushed into the liner pipe and sufficient resilience to engage with the inner surface of the liner pipe and create said seal. As in the previously described embodiment, a test fluid supply line 355 passes through the flanges 353a, 353b, 353c for fluid communication there through.

The leak testing apparatus 351 is shown as comprising three such flanges but any number of flanges, including a single flange, may be arranged to provide the required seal. Furthermore, any suitable material may be utilised; for example the flanges may comprise a polymer material such as polyethylene. A similar packer without the test fluid supply line and associated components may be provided for use as a packer at the pulling cone end of the liner pipe similarly to the embodiment described with reference to FIG. 3.

Again, the leak testing apparatus 351 may be modified to perform the leak test as a vacuum test instead of a pressure test.

For the purposes of illustration the present invention has been described in the general context of lining a buried pipe. It will be readily understood that the testing technique described herein has applications and utility in any lining process; for example in the lining of risers, subsea water injection pipelines, and onshore transportation pipelines for refined or crude products. In this way, polymer lined pipelines for the oil and gas industry can be provided with integrity test results confirming suitability for the demanding applications concerned. As such, the term "host pipe" or "pipe" will be understood to encompass any pipe or pipeline—even pipes and pipelines that have already been lined.

Furthermore, it is foreseen that the advantages of the present invention could also be realised by performing the leak test in the annular volume between the liner pipe and the host pipe, in which case the test volume may be created by providing annular seals between the liner pipe and the host pipe at opposite ends of the liner pipe. This may also give an indication of the integrity of the host pipe.

The invention enables the integrity of a liner pipe to be quickly and effectively tested in the field, while permitting rapid removal and replacement of the liner pipe if it is compromised. The liner pipe is leak tested prior to reversion, after being pulled through a host pipe to be lined via swaging die, and while the liner pipe is still under tension. If the liner pipe exhibits a leak, it can be removed from the liner pipe immediately, and importantly before it has expanded to contact the host pipe. Leak testing apparatus comprises a packer which seals the opposite end of the liner pipe from the end which is pulled, creating a contained fluid volume upon which the leak test is performed. The leak test may be a pressure test or a vacuum test, or any other suitable test as discussed herein.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A method of testing the integrity of a pipe lining, the method comprising pulling the pipe lining at least partially through a host pipe to be lined via an apparatus comprising one or more dies which temporarily reduces the external diameter of the pipe lining, and performing a leak test on the pipe lining prior to releasing pulling tension on the pipe lining.

2. The method according to claim 1, wherein performing the leak test comprises creating an enclosed volume within the pipe lining, at least partially evacuating the enclosed volume, and monitoring the pressure within the enclosed volume.

3. The method according to claim 2, wherein at least partially evacuating the enclosed volume comprises removing air from the enclosed volume.

4. The method according to claim 3, wherein air is removed from the enclosed volume using a vacuum pump.

5. The method according to claim 1, wherein performing the leak test comprises creating an enclosed volume within the pipe lining, pressurising the enclosed volume, and monitoring the pressure within the enclosed volume.

6. The method according to claim 5, wherein the enclosed volume is pressurised to 300 mbar.

7. The method according to claim 2, wherein the enclosed volume is re-pressurised after a pre-determined time period has elapsed.

8. The method according to claim 2, wherein creating an enclosed volume within the pipe lining comprises inserting one or more packers.

9. The method according to claim 8, wherein a first packer is inserted proximal a first end of the pipe lining and a second packer inserted proximal an opposite end of the pipe lining.

10. The method according to claim 8, wherein pressurising or at least partially evacuating the enclosed volume comprises injecting or removing air via a conduit extending through at least one of the one or more packers.

11. The method according to claim 2, wherein monitoring the pressure within the enclosed volume comprises calculating a pressure differential after a pre-determined time period has elapsed.

12. The method according to claim 1, wherein performing the leak test comprises creating an enclosed volume within the pipe lining, pressurising or at least partially evacuating the enclosed volume, and monitoring for ultrasound signals within the enclosed volume, in an annular space between the pipe lining and the host pipe, and/or outside the host pipe.

13. The method according to claim 12, wherein performing the leak test comprises determining a position of one or more leaks by translating an ultrasound detector relative to the pipe lining and measuring ultrasound signals as a function of position.

14. The method according to claim 13, wherein the ultrasound detector is located externally to the host pipe.

15. The method according to claim 1, further comprising removing the pipe lining from the host pipe responsive to the leak test.

16. The method according to claim 1, further comprising replacing or repairing the pipe lining prior to pulling the pipe lining through the host pipe.

17. The method according to claim 1, further comprising releasing pulling tension on the pipe lining responsive to the leak test.

18. The method according to claim 1, wherein the apparatus comprises one or more rollers.

19. A method of lining a pipeline, the method comprising testing the integrity of the pipe lining by the method of claim 1, and subsequently releasing pulling tension on the pipe lining to allow the pipe lining to expand into contact with the pipeline.

20. The method according to claim 19, further comprising retrieving the pipe lining prior to releasing pulling tension in the event of detecting a leak in the pipe lining, repairing or replacing the pipe lining, and pulling the repaired or replacement pipe lining at least partially through the pipeline via apparatus which temporarily reduces the external diameter of the pipe lining.

21. The method according to claim 20, wherein a leak test is performed on the repaired or replacement pipe lining prior to releasing pulling tension on the repaired or replacement pipe lining.

22. The method according to claim 19, wherein the leak test is a vacuum test.

23. The method according to claim 19, wherein the leak test is a pressure test.

24. A pre-reversion leak testing apparatus for testing the integrity of a pipe lining of temporarily reduced external diameter, the pre-reversion leak testing apparatus comprising:
a packer configured to define a test volume by providing an annular seal within the pipe lining prior to undergoing a reversion process comprising expanding the pipe lining radially towards its original dimensions;
a conduit extending through the packer for pressurizing or at least partially evacuating the test volume; and
a leak detector for detecting one or more leaks from or into the test volume when pressurized or at least partially evacuated, the leak detector comprising a pressure sensor which, in use, is in fluid communication with the test volume.

25. The apparatus according to claim 24, wherein the conduit comprises one or more valves arranged, adapted and/or configured to control the flow of leak test fluid to and/or from the test volume.

26. The apparatus according to claim 24, wherein the packer is inflatable.

27. The apparatus according to claim 24, wherein the packer comprises one or more flanges.

28. The apparatus according to claim 24, further comprising a pump.

29. The apparatus according to claim 28, wherein the pump is a vacuum pump arranged to remove air and/or other fluid from the test volume.

30. The apparatus according to claim 24, further comprising a fluid source.

31. The apparatus according to claim 30, wherein the fluid source is an air compressor.

32. The apparatus according to claim 30, wherein the fluid source is a compressed air source.

33. The apparatus according to claim 24, further comprising a second packer configured for insertion in the pipe lining at an end opposite the first packer to provide a second seal within the pipe lining, creating a test volume between the first packer and the second packer.

34. The apparatus according to claim 24, further comprising a pressure relief valve configured or selected to open at a predetermined pressure to prevent the pipe lining from collapsing or undergoing forced reversion.

35. A pipe lining system comprising apparatus configured to temporarily reduce the external diameter of a pipe lining, a winch configured to pull the pipe lining through a host pipe via the apparatus, and a pre-reversion leak testing apparatus according to claim 24 configured or arranged to test the integrity of the pipe lining after it has been pulled through the host pipe but prior to release of pulling tension from the winch.

* * * * *